United States Patent
McNutt et al.

(10) Patent No.: US 6,309,004 B1
(45) Date of Patent: Oct. 30, 2001

(54) AUXILIARY TINTED TRANSPARENT SIDE SUN VISOR FOR VEHICLES

(76) Inventors: Eddie Ray McNutt; Mary Sue McNutt, both of 3 Hilton Dr., Conway, AR (US) 72032

( * ) Notice: Subject to any disclaimer, the term of this patent is extended or adjusted under 35 U.S.C. 154(b) by 0 days.

(21) Appl. No.: 09/799,267

(22) Filed: Mar. 5, 2001

Related U.S. Application Data

(60) Provisional application No. 60/258,581, filed on Dec. 28, 2000.

(51) Int. Cl.[7] ........................................................ B60J 3/02
(52) U.S. Cl. ................................................................ 296/97.6
(58) Field of Search .............................................. 296/97.6

(56) References Cited

U.S. PATENT DOCUMENTS

| | | | | |
|---|---|---|---|---|
| D. 432,490 | * | 10/2000 | Golenz | D12/417 |
| 4,526,415 | * | 7/1985 | Jardine | 296/97.6 |
| 5,098,149 | * | 3/1992 | Lee | 296/97.6 |
| 5,165,748 | * | 11/1992 | O'Connor | 296/97.6 |
| 5,259,657 | * | 11/1993 | Arendt et al. | 296/97.6 |
| 5,730,484 | * | 3/1998 | Robinson | 296/97.6 |
| 5,762,246 | * | 6/1998 | Drew | 296/97.6 X |
| 6,139,084 | * | 10/2000 | Miles | 296/97.6 |

FOREIGN PATENT DOCUMENTS

| | | | | |
|---|---|---|---|---|
| 2156294 | * | 10/1985 | (GB) | 296/97.6 |
| 2253822 | * | 9/1992 | (GB) | 296/97.6 |

* cited by examiner

Primary Examiner—Joseph D. Pape

(57) ABSTRACT

An auxiliary sun visor comprising a tinted transparent plastic glare shield molded onto a plastic strap which attaches temporarily to the permanent sun visor by means of interlocking fabric. The auxiliary sun visor rotates (pivots) to the side window thereby allowing sun visors to be deployed on windshield and front side window simultaneously. The interlocking fabric method of attachment to permanent sun visor will not interfere with newly innovated head curtain side air bags. If this auxiliary sun visor is struck by the rapid descending and inflating side air bags the fabric attachment will separate without risk of metal parts becoming projectiles as used in prior art of auxiliary sun visors. The glare shield is made from unbreakable semi-rigid plastic material that will not cause the extensive injuries that a rigid visor with multiple parts and rigid plastic could inflict when the side head curtain air bag rapidly descends from the vehicle roof.

3 Claims, 1 Drawing Sheet

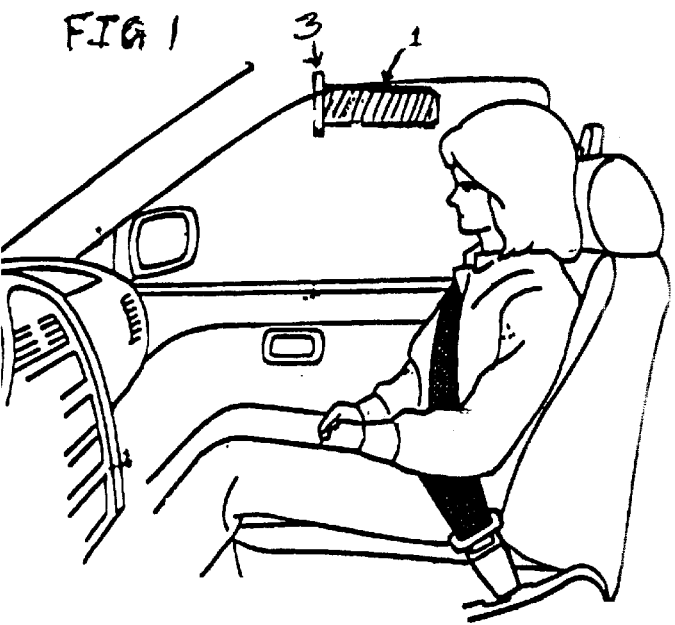
FIG 1
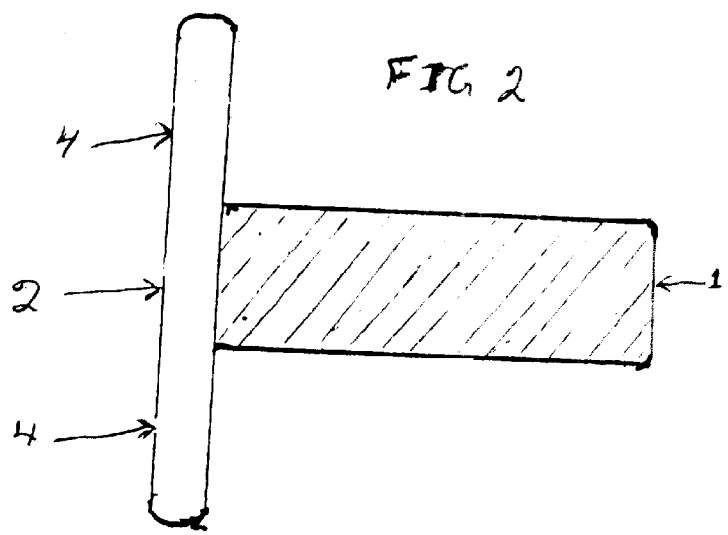
FIG 2
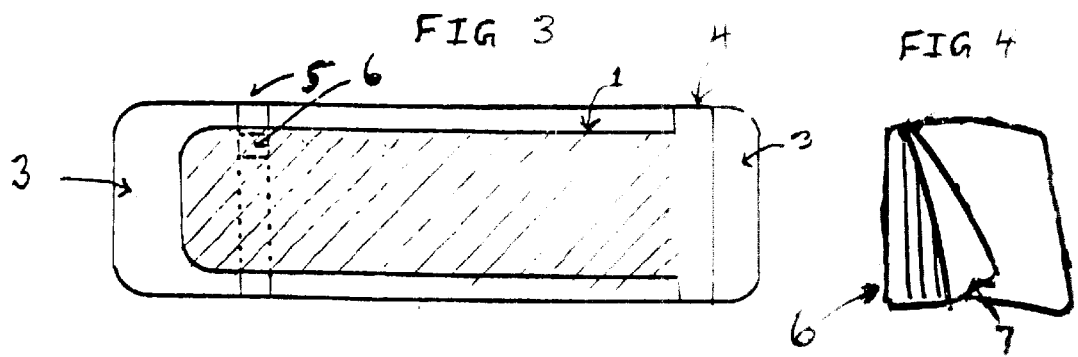
FIG 3
FIG 4

AUXILIARY TINTED TRANSPARENT SIDE SUN VISOR FOR VEHICLES

CROSS-REFERENCE TO RELATED APPLICATIONS

Provisional patent application No. 60/258,581 filing date: Dec. 28, 2000 titled "Rotating Portable Tinted Plastic Side Sun Visor Attachable to Vehicle Sun Visor."

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION (1) Field of Invention

This invention relates to auxiliary glare shield sun visors for motor vehicles that can be attached to the vehicle's factory installed sun visor and pivots to a position whereby it partially shades the side window of the driver or front seat passenger of the vehicle.

(2) Description of the Prior Art

Previously, sun visor attachments have been made that can be attached to the permanent vehicle sun visor to reduce light glare to the driver and front seat passenger. For example, U.S. Pat. No. 4,982,992 issued to Vu, et al, for a glare shield which could be clipped onto a sun visor with alligator clips. U.S. Pat. No. 5,829,816 issued to Cimmino includes a glare shield that slides along a pair of elongated rods and attaches to permanent visor with spring clips. U.S. Pat. No. 5,855,405 issued to Urbano which is a sun visor with extending shields attached to an extending column projecting from an actuator. U.S. Pat. No. 5,954,386 issued to Thomas was for a sun guard attached to permanent visor by a clip having at least one double clamp spring.

Prior to our invention others have invented auxiliary pivotal side sun visors. In most cases the auxiliary visors required extensive modifications in the permanent sun visor or in its mounting hardware. Also, extensive hardware was required to attach the auxiliary visor to the permanent visor. We are proposing an auxiliary sun visor that requires virtually no modification to the permanent sun visor and no metal or rigid hardware to attach the auxiliary sun visor to the permanent sun visor.

SUMMARY OF THE INVENTION

Our proposed auxiliary sun visor comprises a glare shield of tinted transparent non-breakable semi-flexible plastic material molded onto a plastic strap which attaches to the permanent sun visor. Our auxiliary sun visor can pivot to the side window when the permanent visor is deployed down on the windshield. It can be used on driver or passenger side. The main differences between our invention and prior art are
(1) Our auxiliary sun visor is a glare shield made of semi-flexible plastic which is unbreakable.
(2) Our auxiliary sun visor attaches to the permanent sun visor without any clips, clamps, hooks, rods or other articles of metal.

These differences and improvements are very important with the innovation of the Head Curtain Air Bags. The rapid inflation head bags descend from the roof directly above the front doors of the vehicle.

The permanent sun visor, when pivoted to the side window or a rigid auxiliary sun visor could interfere with the proper rapid deployment of the side curtain air bag causing serious injury to the driver or front seat passenger of the vehicle.

Because the metal attachments are not used in our invention, there is no danger of flying metal parts when the side curtain air bags suddenly deploy downward. Under the prior art the air bags could force the auxiliary visor from the permanent visor with such force that the metal parts would become dangerous projectiles inside the vehicle during a crash. Also, our semi-flexible plastic glare shield would not increase injury to the occupant whereas a rigid visor could increase injuries dramatically. Prior art rigid auxiliary visors with multiple parts would be especially dangerous when the side curtain air bags deployed.

BRIEF DESCRIPTION OF THE DRAWING

FIG. 1 is a side elevation view of portable sun visor deployed to side window of a vehicle.

FIG. 2 is a view of portable sun visor unattached with straps that wrap around permanent sun visor.

FIG. 3 is a view of auxiliary sun visor attached to permanent sun visor when not deployed.

FIG. 4 is a view of interlocking fabric with backing covering adhesive side of fabric to be applied on glare shield of auxiliary sun visor.

DESCRIPTION OF THE PREFERRED EMBODIMENT

In FIG. 1 the auxiliary side glare shield (1) is shown attached to the permanent sun visor (3) and rotated (pivoted) to passenger side window.

In FIG. 2 the semi-rigid tinted transparent plastic glare shield (1) is attached to the flexible plastic attachment (2) by heat, pressure, and adhesive. Attachment 2 is flexible plastic material which permits visor to rotate 180 degrees on its vertical axis. Attachment 2 is attached to the vehicle's permanent sun visor (3) by straps (4) extending approximately 5 inches in length and 1.5 inches in width. The straps section of attachment 2 comprises opposing pieces of fabric that fasten by interlocking pile when pressed together. One strap has the interlocking pile fabric on the inside of strap and the other strap has the interlocking pile fabric on the outside so that they fasten together when overlapped on the permanent sun visor. When the permanent sun visor is deployed down the portable tinted plastic sun visor may rotate (pivot) to the side window for reducing sun and light glare.

Strap (5) in FIG. 3 is a plastic strap that is wrapped around the permanent sun visor (3) near the opposite end of the permanent sun visor from the pivot end. Strap (5) consists of a flexible plastic strap with interlocking fabric applied to approximately four inches of both ends on opposing sides in order that they can lock together around the permanent visor. The strap that is the outer strap also has interlocking fabric on both sides of strap. Part (6) in FIG. 4 is piece of plastic material with adhesive on one side covered by removable material (7). The opposite side of part (6) in FIG. 4 consists of interlocking fabric that will match with fabric on end of (5) in FIG. 3. User of our invention will wrap (5) around permanent sun visor near opposite end from pivot point. User will then remove covering (7) from adhesive side of part (6) of FIG. 4 and apply fabric piece (6) to glare shield at point where attached auxiliary sun visor shield crosses strap (5) in FIG. 3. This will hold the glare shield section of auxiliary sun visor to the permanent sun visor when the auxiliary sun visor is not deployed to side window.

Although the best mode contemplated for carrying out the invention has been described, it will be apparent that modification and variation may be made without departing from the subject matter of the invention. Therefore, the scope of the invention is to be determined by the claims that follow.

What is claimed is:

1. An auxiliary attachment for original-equipment, factory-installed sun visors associated with vehicles, the attachment comprising:

a generally rectangular, tinted, plastic shield adapted to be attached to the sun visor;

a flexible, plastic strap for securing the attachment to the sun visor, the plastic strap adapted to circumscribe the visor;

means for pivotally securing the shield to said strap such that the shield may be pivotally folded between leftward and rightward positions flatly nested against the visor wherein the shield is substantially parallel with and flushly nested against the visor and an intermediate deployed position wherein the shield is disposed substantially perpendicularly to the visor and projects outwardly therefrom in a direction longitudinally aligned with the length of the vehicle; and, whereby the shield may be selectively disposed in an operative orientation generally angled or perpendicular with respect to the visor to reduce glare coining from a direction generally sideways to the driver of the vehicle.

2. The auxiliary attachment as defined in claim 1 wherein the strap and the shield are integrally molded.

3. The auxiliary attachment as defined in claim 1 wherein the plastic strap comprises a pair of interlocking, pile fabric elements on opposing ends that are adapted to be selectively coupled to one another for installation, whereby the strap circumscribes and attaches to the vehicular sun visor without clips, hooks, brackets or other articles of metal.

* * * * *